3,748,317
NONBURNING, LOW SMOKE, LOW TOXIC GAS-PRODUCING THERMOSETTING PREPREG COMPOSITIONS
Stanley Oswitch, University Heights, and Robert F. Golownia, Warrensville Heights, Ohio, assignors to Ferro Corporation, Cleveland, Ohio
No Drawing. Continuation of application Ser. No. 52,076, July 2, 1970. This appplication Jan. 5, 1972, Ser. No. 215,692
Int. Cl. C08g 51/10
U.S. Cl. 260—37 R          15 Claims

ABSTRACT OF THE DISCLOSURE

The prepreg compositions disclosed herein comprise a fiber-reinforced composition in which the binder is a furane resin containing a latent catalyst such as a boron trifluoride-amine for curing the prepreg. These prepregs are found suitable for application to the interior of aircraft cabins in view of their tendency to give off very little smoke and very little toxic gases upon exposure to flames.

---

This is a continuation of application Ser. No. 52,076, filed July 2, 1970, now abandoned.

BACKGROUND OF THE INVENTION

Field of the invention

This invention relates to prepregs made of furane resins suitable for aircraft interiors. More specifically, these comprise fiber-reinforced prepregs containing furane resin as the binder and a boron trifluoride-amine catalyst. More specifically, it relates to such compositions which are fire retardant and give off very little smoke and toxic gas upon exposure to flames.

Description of the prior art

A serious limitation of reinforced plastics for structural use, such as in the interior of an aircraft, is the degree of flammability of the resin binder used. Most matrix or binder resins can be rendered "free-retardant" or "self-extinguishing" by the inclusion of halogenated compounds which, upon heating, liberate gases which can smother the flames of a burning material. However, while this may reduce the flammability hazards, it creates a new menace in an aircraft cabin occupied by passengers or operating personnel. These same halogenated gases which smother the flames are generally highly toxic. Even if the occupied portion of an aircraft is not immediately exposed to flames, black smoke and volatile halogenated materials liberated from other portions of the aircraft may penetrate the occupied portion of the aircraft and cause panic and great difficulty in evacuation. Investigations have shown that in some airplane disasters victims were asphyxiated by the gases evolved in other parts of the burning craft before evacuation could be effected.

Therefore, in addition to the necessity for having aircraft interiors constructed of five-retardant or self-extinguishing materials, it is also important that this same material should not generate smoke or toxic gases hazardous to human life, or likely to provide panic or difficulties in evacuation.

Phenolic resins can be rendered self-extinguished and capable of giving off only low amounts of toxic gaseous materials. However, such resins require high temperatures and pressures for curing, which requirements introduce undesirable cost factors as well as molding problems.

Polymiides are also capable of being made non-flammable and free of toxic gas formation upon exposure to flames. Here again, high temperatures and high pressure curing are required, and, moreover, the price of such materials is prohibitive. Consequently, the polyimides are used only in the most "exotic" aerospace applications.

While furane resins can be formulated to possess very low flammability, the preparation of prepregs has not been considered possible, as indicated in the evaluation of furane resins given in "Handbook of Reinforced Plastics," published by Reinhold Publishing Corporation (1964), wherein it is stated on page 99, "(e) Dry lay-ups (prepreg) are not possible." On the same page a number of other disadvantages of the furane resins are described, including extreme sensitivity to overcatalyzation.

STATEMENT OF THE INVENTION

It his now been found, surprisingly in view of the prior difficulties inherent in furane resins, possible to produce prepregs of reinforced furnace resins which are storable and suitable for easy application and curing to give structural compositions having fire-retardant properties and giving very little smoke and toxic gases upon exposure to flames. Therefore, in addition to the unexpected feature that the fiber-reinforced furane resins of this invention can be fabricated prepregs which are storable with a latent curing agent therein and easily fabricated as the interiors of aircraft, these are non-flammable, non-smoking and non-toxic gas forming compositions. These materials are much easier to cure than phenolics and give off even less smoke than is produced by the phenolic resins. These compositions are less flammable than phenolics and give off even less smoke than is produced by the phenolic resins. These compositions are less flammable than phenolics and polyesters and in rigid laminates have structural strength about the same as obtained with polyesters. In fabrication, these furane resin compositions, being easier to cure than the phenolics, require shorter curing cycles. Moreover, because of the greater inherent resistance to flammability, very little, if any, of a five-retardant material is required, and, therefore, much less toxic gas is produced upon exposure to flames than is the case with phenolics or polyester resins. Furthermore, where the compositions of this invention are carbonized by exposure to flames, they have a high "char" or "coking factor which results in a surprisingly high level of strength retention.

The term "furane resins" is intended to mean the condensate resins produced from furfuryl alcohol, modified, if desired, with up to 50 or 60% furfural. These resins are produced by known procedures, and it is generally desirable to have a molecular weight of at least 1000, preferably at least 2000 for such purpose. The upper limit on the molecular weight is not critical and is determined by practical factor of workability. Thus it is desirable that the resin is not of such a high molecular weight to have it in a non-workable or non-pliable viscostiy range. Generally molecular weights as high as 50,000 are workable and with plasticizers or softening agents, molecular weights as high as 100,000 may still be made workable.

While as little as 0.01 part of a halogenated material will give notable fire-retardant properties to the furane resin, it is generally desirable to use 4–20 parts by weight, preferably 4–8 parts by weight per 100 parts of resin. A particularly preferred halogenated material for this purpose is a brominated phosphate ester, such as tris(2,3-dibromopropyl)phosphate. Other halogenated fire-retardant materials can also be used as taught in the prior art for other types of resins. However, in each case, the amount of such halogen-containing material used is much less than required for other resins to produce an equivalent fire-retardancy and is advantageously in the ranges cited above.

The curing catalysts generally used with commercially available furane resins include p-toluene sulfonic acid, phosphoric acid, and the like. However, these catalysts cause premature polymerization and crosslinking to occur and within a few hours the furane resin is cured to such a degree that it excludes its use in prepregs.

Advantageously the furane resin in the prepreg should have a sufficiently high viscosity that it will not require a long or extended curing cycle. Moreover, the curing system should be sufficiently latent to permit extended storage or shelf life for the prepreg.

For these purposes it has been found desirable to use a furane resin having a viscosity in the range of 100–1000 centipoises, preferably 200–400 centipoises at 23° C. in a 65% solution in methyl ethyl ketone. While resins of lower viscosity can be used, and a B-stage curing effected to bring the resin within the desired viscosity range, it is generally preferred to use a resin of the specified viscosity in preparing the prepeg. It is not objectionable to have the viscosity of the resin increased after the mixing with the fiber glass or other fiber reinforcement provided that the prepreg is still sufficiently flexible and workable for its ultimate application.

While most of the common catalysts previously used with furane resins cause premature curing, it has been found that complexes of Lewis acids, such as boron trifluoride-amine salts, exhibit a latent catalytic effect which makes it possible to incorporate them into the furane resin and thereby form a prepreg which has satisfactory shelf life for storage and subsequent use.

The boron trifluoride-amine catalysts are preferred. These are prepared according to known methods. A convenient method comprises slowly adding an ether solution of boron fluoride ethereate to an ether solution of the appropriate amine. Stoichiometric amounts are used. After the addition is completed, petroleum ether is added to precipitate the boron trifluoride-amine compound which is filtered and dried under vacuum to yield the final product. Certain of these amine salt compounds are available commercially, such as the boron trifluoride-monoethylamine complex. Others can be prepared as described above.

Typical amines that can be complexed with boron trifluoride to give suitable catalysts include, but are not limited to, the following: methyl amine, ethyl amine, propyl amine, butyl amine, hexyl amine, octyl amine, benzylamine, cyclohexyl amine, pyridine, piperidine, aniline, dimethyl amine, diethylamine, dipropylamine, diamylamine, didecyl amine, dibenzyl amine, trimethyl amine, triethyl amine, benzyldimethyl amine, diphenyl amine, and the like. Advantageously the hydrocarbon portions do not total more than 20 carbon atoms and preferably no more than 10 carbon atoms. Primary amines are preferred.

Other Lewis acid complexes that can be used include zinc chloride, ferric chloride, and the like, also complexed with amines as listed above.

The amount of catalyst is advantageously 1–15 parts of complex per 100 parts of resin, preferably 2–10 parts.

Although fiber glass is preferred as the reinforcing fiber, various other fiber reinforcing materials may be used such as nylon, Orlon, polyvinylacetate, polyvinyl chloride, polyester and other synthetic fibers, as well as rayon, asbestos, paper, steel, and the like. These fibers may be used in various forms, such as yarn, roving, web, mat and weave.

The resin content is advantageously in the range of 20–50%, preferably 35–45% based on the combined weight of fiber and resin. The methods of impregnating the fibers are similar to those generally used in impregnating fibers with other types of resins. The fibers, roving, web, mat, etc., can be dipped manually or mechanically into a bath of the resin in liquid form, either molten or solution, and allowed to remain in the bath for sufficient time to accumulate the desired amount of resin in the fiber material.

The excess liquid is then generally squeezed off and the resin B-staged and solvent removed therefrom by passing the impregnated fibers through or allowing them to stand in an oven at an appropriate temperature. Generally a temperature in the range of 80–120° C. is suitable for this purpose. Longer periods are used with the lower temperatures in the range, and when higher temperatures are used the residence time may be shorter. However, when the higher temperatures are used, there is greater danger of curing beyond the desired state, and for that reason it is generally preferred to use temperatures in the lower part of the range. For example, when acetone is used as the solvent, the impregnated fibers are allowed to remain in an oven at 110° C. for 1–10 minutes, preferable about 5 minutes. When the temperature is about 80° C. a heating period of 15–20 minutes may be more suitable.

The furane resin advantageously has a viscosity in the range of 100–1000, preferably 200–400 centipoises at 23° C. and a concentration of 65% in methyl ethyl ketone. When the viscosity is below this range the cure time may be prolonged. When the viscosity is too high the resultant prepreg may be too stiff or rigid to work with. When the viscosity is above that which will easily impregnate the fiber material, a solvent may be used to lower the viscosity. For most purposes, acetone or methyl ethyl ketone is used as solvent, generally in a proportion of 35–75%, preferably about 50%. Other appropriate solvents can be used if desired.

The furfuryl alcohol resin can be a homopolymer or can be modified with furfural to give a copolymer of the two. In such case as much as 50–60% furfural can be used to modify the furfuryl alcohol during polymerization. Where desired, a sizing agent can be used to improve contact and adhesion between the resin and the fibers, especially for glass fibers. For glass fibers, various silanes are preferred, particularly aminosilanes. A number of these are available commercially.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

A number of glass fabric pieces (Volan finished Ferro-970–P39) are pulled through a solution containing 50% acetone, 50% furane resin and varying amounts of either $BF_3$-monoethylamine or $BF_3$-pyridine catalyst. The resin is a copolymer of 50% furfuryl alcohol and 50% furfural and has a viscosity of 300 centipoises at 23° C. in a 65% concentration in methyl ethyl ketone. After the glass fabric is removed from the impregnating bath, it is passed between two 1½″ diameter steel cylinders spaced with shims in order to squeeze off excess solution. The material is then B-staged by hanging it in an air circulating oven for five minutes at 100° C. to remove solvent and achieve the desired level of tack and drape. Samples of these are set aside and stored for several months, at the end of which time the resin is still in a pliable condition. A laminate is prepared from 14 plies of such prepreg and pressed to ⅛″ stops. A Mylar film of 2 mil thickness is used as a release agent. A press cure is applied for one hour at 90° C. followed by two hours at 120° C. Then the laminates are removed from the press and post-cured for two hours at 120° C. The laminate hardness is determined on a "Barcol" impressor (Model GYZJ 934–1) and the values reported below are the average of at least five separate readings. Glass content is determined by a "burnoff" procedure by first igniting the piece in a Bunsen burner flame and then burning off the remaining organic matter in a laboratory muffle furnace for a period of one hour at 600° C. The glass content is determined to be in the range of 72–77%. The flexural strength is determined according to ASTM Method D–790–63 using samples having dimensions of ⅛″ x 1″ x 3″ in a 20,000 lb. Inston Universal Test Machine using a 3″ span, 0.05 in./min. crosshead speed and ambient temperatures. The shear strength is determined by ASTM Method D2344 using samples having dimensions of ⅛" x ½" x 1½" and using the machine and operating conditions similar to those used for determining the flexural strength. In using the above procedure a number of times, variations are used in the catalyst concentration and in the type of catalyst. The catalysts consist of a boron trifluoride-amine complex in which the two components are used in stoichiometric proportions and the amines used are monoethylamine and pyridine. In the table given below the types of catalysts and the concentrations are indicated and the Barcol hardness is reported after the press cure and also after the press cure plus post cure.

phosphate. Upon testing for non-flammability each of the laminates received a 100% rating according to the Hooker HLT-15 Test. Laminates are made of 14 plies and have glass contents of 72–76%. The flexural, shear strength and ignition properties are as reported in the table below.

| Amount of additive (p.p.h.) | | Flexural | | Shear strength, (p.s.i.) | ASTM D635-63, 30 sec. | Ignition, 60 sec. |
|---|---|---|---|---|---|---|
| $Sb_2O_3$ | FM-T23P | Strength (p.s.i.) | Modulus (p.s.i.) | | | |
| 0 | 0 | 43,900 | $3.7 \times 10^6$ | 3,300 | 5 sec. burn | NB |
| 3 | 0 | 44,900 | $3.5 \times 10^6$ | 3,400 | 7 sec. burn | NB |
| 0 | 6 | 46,500 | $3.5 \times 10^6$ | 2,980 | NB | NB |
| 1 | 2 | 45,700 | $3.3 \times 10^6$ | 3,030 | 2 sec. burn | NB |

| Catalyst | Catalyst concentration (p.p.h.) | Barcol hardness | |
|---|---|---|---|
| | | Press cure only | Press and cure |
| $BF_3 \cdot MEA$ | 2 | 20 | 50 |
| $BF_3 \cdot MEA$ | 4 | 37 | 60 |
| $BF_3 \cdot MEA$ | 8 | 50 | 65 |
| $BF_3 \cdot PYR$ | 2 | 35 | 55 |
| $BF_3 \cdot PYR$ | 4 | 38 | 58 |
| $BF_3 \cdot PYR$ | 6 | 30 | 52 |
| $BF_3 \cdot PYR$ | 8 | 38 | 60 |

Smoke generation testing performed according to the Douglas Material Specification 1506 of the McDonnell-Douglas Corporation shows very good results as shown in the table below.

TEST RESULTS

| | Sample No. | | | Average |
|---|---|---|---|---|
| | 1 | 2 | 3 | |
| Weight, grams | 6.6863 | 6.6445 | 6.6570 | |
| Number of piles | 1 | 1 | 1 | |
| Thickness of sample, in | 0.232 | 0.230 | 0.233 | |
| Max. smoke density, percent | 1 | 1 | 1 | 1. |
| SDR,[1] 2 minutes, percent | 0.0312 | 0.0312 | .0312 | 0.0312. |
| SDR, 4 minutes, percent | 1.25 | 1.25 | 1.25 | 1.25. |
| Photocell residue, percent | None | None | None | None. |
| Visibility (exit sign) | Excellent | Excellent | Excellent | |
| Color of smoke | None | None | None | |
| Position of sample up | Normal | Normal | Normal | |

[1] Smoke density reading.

EXAMPLE II

The procedure of Example I is repeated using an aminosilane as glass sizing and using eight parts of the $BF_3$-monoethylamine complex as catalyst per 100 parts of resin. The product after processing as in Example I has a flexural strength of 40,300 p.s.i., a flexural modulus of $3.2 \times 10^6$ p.s.i. and a shear strength of 3,170 p.s.i.

EXAMPLE III

The procedure of Example I is repeated using per hundred parts of resin one part of a coupling agent comprising $H_2N(CH_2)_2HN(CH_2)_3Si(OCH_3)_3$. In this case the flexural strength is 48,500 p.s.i., the flexural modulus is $3.5 \times 10^6$ p.s.i. and shear strength is 3,430 p.s.i. When repeated using a commercial composition similar to that above, the flexural strength is 55,400 p.s.i., the flexural modulus is $3.5 \times 10^6$ p.s.i. and shear strength is 4,280 p.s.i.

EXAMPLE IV

The procedure of Example I is repeated a number of times using various proportions of fire-retardant materials, namely antimony oxide ($Sb_2O_3$) or tris(dibromopropyl)

EXAMPLE V

The procedure of Example I is repeated a number of times with satisfactory fire-retardant, non-smoking and non-toxic gas-formation results using individually in place of the $BF_3 \cdot MEA$ equivalent amounts respectively of:

$ZnCl_2 \cdot MEA$  
$FeCl_3 \cdot MEA$  
$BF_3 \cdot$ monobutylamine  
$BF_3 \cdot$ aniline  
$BF_3 \cdot$ cyclohexyl amine  
$BF_3 \cdot$ diethylamine  
$BF_3 \cdot$ triethylamine

EXAMPLE VI

The procedure of Example I is repeated a number of times using individually in place of the resin of that example an equal amount respectively of furfuryl alcohol homopolymer of corresponding viscosity and of a copolymer of 75% furfuryl alcohol and 25% furfural.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A storable, partially cured, dry prepreg adapted to be placed at a point of use and subsequently finally cured, said prepreg consisting essentially of a fiber-reinforced thermosetting furane resin containing 50–80 parts by weight of said reinforcing fibers and 20–50 percent by weight of said resin, based on the combined weight of fibers and resin, said resin containing 1–15 parts of a latent catalyst consisting essentially of a Lewis acid-amine complex per 100 parts of resin, said Lewis acid being selected from the class consisting of boron trifluoride, zinc chloride and ferric chloride, and said furane resin consisting essentially of condensation polymers of 40–100 percent by weight of furfuryl alcohol and 0–60 percent by weight of furfural, said latent catalyst being effective above about 90° C.

2. The prepreg of claim 1 in which said Lewis acid is boron trifluoride.

3. The prepreg of claim 1 in which said amine is a primary amine.

4. The prepreg of claim 1 in which said amine is an alkyl amine of no more than 10 carbon atoms.

5. The prepreg of claim 1 in which said reinforcing fiber is fiber glass.

6. The prepreg of claim 1 in which said resin comprises a copolymer of approximately 50 percent by weight of furfuryl alcohol and 50 percent by weight of furfural.

7. The prepreg of claim 6 in which said copolymer has a viscosity of 100–1000 centipoises at 23° C. in a methyl ethyl ketone solution of 65 percent by weight of copolymer.

8. The prepreg of claim 7 in which said viscosity is 200–400 centipoises.

9. The prepreg of claim 1 in which said amine is monoethylamine.

10. The prepreg of claim 1 in which said resin content is 35–45 percent by weight of the combined weight of resin and fiber.

11. The prepreg of claim 10 in which said resin contains 4–8 parts of tris(dibromopropyl)phosphate per 100 parts of resin.

12. The prepreg of claim 1 in which said resin contains 4–20 parts of antimony oxide per 100 parts of resin.

13. The prepreg of claim 1 in which said resin contains 4–20 parts of tris(dibromopropyl)phosphate per 100 parts of resin.

14. The prepreg of claim 1 in which said resin contains 4–8 parts of tris(dibromopropyl)phosphate per 100 parts of resin.

15. The prepreg of claim 1 in which said amine of the Lewis acid-amine complex is selected from the group consisting of alkyl, cycloalkyl, aryl, aralkyl and heterocyclic amines having hydrocarbon portions of no more than 20 carbon atoms.

References Cited

UNITED STATES PATENTS

| | | | |
|---|---|---|---|
| 2,768,408 | 10/1956 | Strigle | 18—55 |
| 3,529,053 | 9/1950 | Smith | 264—236 |
| 3,487,043 | 12/1969 | Grudus | 260—41 |
| 3,278,635 | 10/1966 | Bastian | 260—823 |
| 3,053,690 | 9/1962 | Jaffe | 117—72 |
| 3,491,041 | 1/1970 | Dornte | 260—18 |

OTHER REFERENCES

Flame Retardants, Lindemann, Industrial & Eng. News Chem., vol. 61, May 1969, pp. 70–75.

MORRIS LIEBMAN, Primary Examiner

R. ZAITLEN, Assistant Examiner

U.S. Cl. X.R.

260—67 FA, 88.5 R